United States Patent [19]

Kenworthy et al.

[11] Patent Number: 4,879,089
[45] Date of Patent: Nov. 7, 1989

[54] LIQUID METAL COOLED NUCLEAR REACTORS

[75] Inventors: Gordon Kenworthy, Leigh; Colin H. Mitchell, Knutsford; Keith S. Hawkins, Wirral, all of England

[73] Assignee: National Nuclear Corporation Ltd., Knutsford, England

[21] Appl. No.: 5,653

[22] Filed: Jan. 21, 1987

[30] Foreign Application Priority Data

Feb. 12, 1986 [GB] United Kingdom ............... 8603398

[51] Int. Cl.⁴ .............................................. G21C 13/04
[52] U.S. Cl. ..................................... 376/399; 376/404
[58] Field of Search ............... 376/399, 403, 404, 405; 165/128

[56] References Cited

U.S. PATENT DOCUMENTS

| | | | |
|---|---|---|---|
| 4,249,995 | 2/1981 | Jogand | 376/403 |
| 4,302,296 | 11/1981 | Sharbaugh et al. | 376/404 |
| 4,561,387 | 12/1985 | Korkemeier et al. | 165/128 |
| 4,613,478 | 9/1986 | Sharbaugh | 376/399 |
| 4,664,876 | 5/1987 | Votani et al. | 376/404 |

FOREIGN PATENT DOCUMENTS 2036828 12/1970 France .

OTHER PUBLICATIONS

Kenworthy et al., "Study of Nat. Conv. Phenomena in an LMFBR Inter. Plenum," *Liq. Met. Eng. & Tech.*, pp. 179–185 vol. 1, 1984.

Primary Examiner—Deborah L. Kyle
Assistant Examiner—Richard W. Wendtland
Attorney, Agent, or Firm—William R. Hinds

[57] ABSTRACT

In a liquid metal cooled fast breeder nuclear reactor of the pool type, the hot and cold pools (13, 19) are separated by an intermediate plenum (24) which, under steady state conditions, encloses a volume of substantially stagnant liquid metal to form a thermal barrier between the hot and cold pools (13, 19). To avoid undesirably large temperature differentials developing for example in the event of large temperature excursions within the hot pool (13) as a result of a reactor trip, the intermediate plenum (24) is designed to permit, in such circumstances, rapid interchange of liquid metal coolant between the hot pool and the intermediate plenum, for example by way of a thermal siphon arrangement (30).

16 Claims, 4 Drawing Sheets

LIQUID METAL COOLED NUCLEAR REACTORS

This invention relates to liquid metal cooled nuclear reactors of the kind in which the liquid metal coolant is circulated from a relatively cool region (herein called the cold pool) of the reactor primary vessel through the reactor core where the coolant is in heat exchange relationship with nuclear fuel and emerges at a higher temperature in a higher region (herein called the hot pool) of the reactor vessel, the coolant then being returned from the hot pool to the cold pool via heat exchangers which serve to extract heat from the hot coolant for conversion to other forms of energy, e.g. by way of steam generating plant. Typically, in normal operating circumstances, the mean operating temperatures of the hot and cold pools are of the order of 540° C. and 370° C. respectively.

In this kind of reactor, it has been previously proposed to introduce a thermal barrier between the hot and cold pools by way of an intermediate plenum encircling the reactor core and enclosing a substantially stagnant volume of coolant which undergoes thermal stratification, thereby providing thermal resistance between the hot and cold pools and protecting the pool separator structure which provides the pressure boundary between the hot and cold pools. The intermediate plenum also serves to establish an extended thermal gradient for reactor internal structures, such as the shells that contain the heat exchangers and coolant pumps which pass through the plenum. One proposal for an intermediate plenum is disclosed by G. Kenworthy et al in a paper "Study of natural convection phenomena in LMFBR intermediate plenum"—Liquid Metal Engineering and Technology (April, 1984), Vol 1, Page 179, British Nuclear Engineering Society.

A potential drawback with the design disclosed in the above Kenworthy reference is the low speed of response to thermal transients within the hot pool. For instance, in the event of a reactor trip, the temperature of the coolant entering the hot pool from the reactor core is reduced considerably and, as a result, the temperature within the hot pool may fall within a very short space of time to 400° C. or below. With the previously proposed intermediate plenum design, this could lead to a considerable temperature differential across the upper plate of the intermediate plenum with the risk of unacceptable thermal stressing of the structure.

The object of the present invention is to provide a nuclear reactor of the kind specified in which the intermediate plenum is constructed so as to allow rapid response to temperature changes within the hot pool.

According to the present invention there is provided a liquid metal cooled nuclear reactor, of the kind in which the liquid metal coolant is circulated from a relatively cool region (herein called the cold pool) of the reactor primary vessel through the reactor core where the coolant is in heat exchange relationship with nuclear fuel and emerges at a higher temperature in a higher region (herein called the hot pool) of the reactor vessel, the coolant then being returned from the hot pool to the cold pool via heat exchangers which serve to extract heat from the hot coolant for conversion to other forms of energy, the reactor having an intermediate plenum encircling the reactor core to provide a thermal barrier between the hot and cold pools of the reactor, characterised by means intercommunicating an upper part of the intermediate plenum and the hot pool superimposed in relation thereto to establish therebetween a permanently open, convectively acting communication capable of allowing rapid interchange of coolant convectively and unforced between the intermediate plenum and the hot pool in response to rapid temperature reduction in the hot pool and in a sufficient amount so as to avoid substantial temperature differentials which would otherwise occur between the upper part of the intermediate plenum and the hot pool but incapable of allowing, when the reactor is in a steady state condition, any more than a substantially smaller interchange to occur such as will not materially affect the thermal barrier function of said intermediate plenum.

Thus, in contrast to the previous proposal in which the intermediate plenum is isolated from the strong forced convective flow of coolant within the hot pool so as to ensure a totally stagnant volume of coolant within the intermediate plenum, interchange of coolant between the intermediate plenum and the hot pool is provided for so that, in the event of a rapid thermal transient within the hot pool, interchange of lower temperature coolant from the hot pool and higher temperature coolant from the intermediate plenum can occur thereby enabling the coolant enclosed within the intermediate plenum to respond promptly to temperature changes within the hot pool.

The arrangement is such that the rate of flow of coolant that may occur from the hot pool into the intermediate plenum when the reactor is in a steady state condition is substantially smaller than that which may occur during thermal transient conditions.

Preferably, the arrangement is such that the rate of flow of coolant that may occur from the hot pool into the intermediate plenum when the reactor is in a steady state condition is substantially smaller than that which may occur during thermal transient conditions.

Preferably the coolant interchange routes between the intermediate plenum and the hot pool are provided with deflector means for deflecting inward coolant flow to the intermediate plenum in a predominantly horizontal direction so as to minimise disruption of the thermal stratification conditions within the intermediate plenum during steady state operation of the reactor.

In one embodiment of the invention, the interchange of coolant is effected by thermosiphon means. Thus, the thermosiphon leg may open at its opposite ends into the intermediate plenum and the hot pool respectively and may be in thermal contact with the hot pool so that, when a fall in temperature occurs within the hot pool, a pressure head is developed to create coolant flow along the thermosiphon leg from the intermediate plenum into the hot pool. To compensate for the outward coolant flow along the thermosiphon leg, the intermediate plenum may include one or more openings in communication with the hot pool to admit coolant from the hot pool into the intermediate plenum.

The thermosiphon leg may be constituted by one or more standpipes which communicate at the lower end with the interior of the intermediate plenum and open at the upper end adjacent the normal operating level of the hot pool. Preferably however the thermosiphon leg comprises an annular passage which encircles the hot pool and may be defined between an inner tank, which is located within the reactor primary vessel and encloses the upper regions of the coolant pool, and a radially inwardly spaced, generally vertical annular wall which terminates below the normal operating level of the hot pool. The intermediate plenum may be bounded along its generally vertical outer side by the inner tank and the generally vertical annular wall may penetrate below the top of the intermediate plenum and be formed with a series of circumferentially spaced port holes.

The previously-mentioned openings in the intermediate plenum are conveniently in the form of clearances between the penetration holes in the top of the intermediate plenum and structures, such as the containment shells for the primary pumps and/or heat exchangers, passing through the intermediate plenum. The deflector means in this instance may comprise annular plates encircling such structures and disposed immediately beneath the clearances.

In a second embodiment of the invention the top of the intermediate plenum is of permeable construction and may be realised in a number of ways. For example, the top may be perforated with a large number of relatively small holes or it may comprise a structure of generally vertical honeycomb channels.

Alternatively, the top may comprise an array of generally horizontally disposed plates. In one such arrangement, the plates may be supported in generally co-planar relationship and in spaced relation to one another to form an openwork structure permitting coolant interchange between the hot pool and the intermediate plenum. In this arrangement, the array of plates may be superimposed above an array of generally horizontal deflector plates which overlap with the clearances between the plates above so as to deflect inward coolant flow to the intermediate plenum in a predominantly horizontal direction.

The plates forming the openwork structure may be in relatively closely spaced relation and unsupported at their edges such that, in steady state conditions, flow of coolant into the intermediate plenum is severely restricted and when transient conditions develop and tend to create a temperature differential through the thickness of the plates, the plates deform to enlarge the gaps between adjacent plates and permit increased flow of coolant into the intermediate plenum. This effect may be accentuated by arranging the plates so that juxtaposed plates differ substantially in size.

In a further development of the invention, applicable to each of the embodiments described above, the intermediate plenum may be divided into at least two vertically superimposed sections, the upper of which is in communication with the hot pool and the lower of which is isolated from any convection flow of coolant within the upper section. Thus, the intermediate plenum may be divided into two sections by a generally horizontal plate located beneath the top of roof of the intermediate plenum, which plate may be impermeable to the coolant except for clearances for components such as heat exchanger shells.

To promote further understanding of the invention, various embodiments will now be described by way of example with reference to the accompanying drawings, in which.

Figure 1:
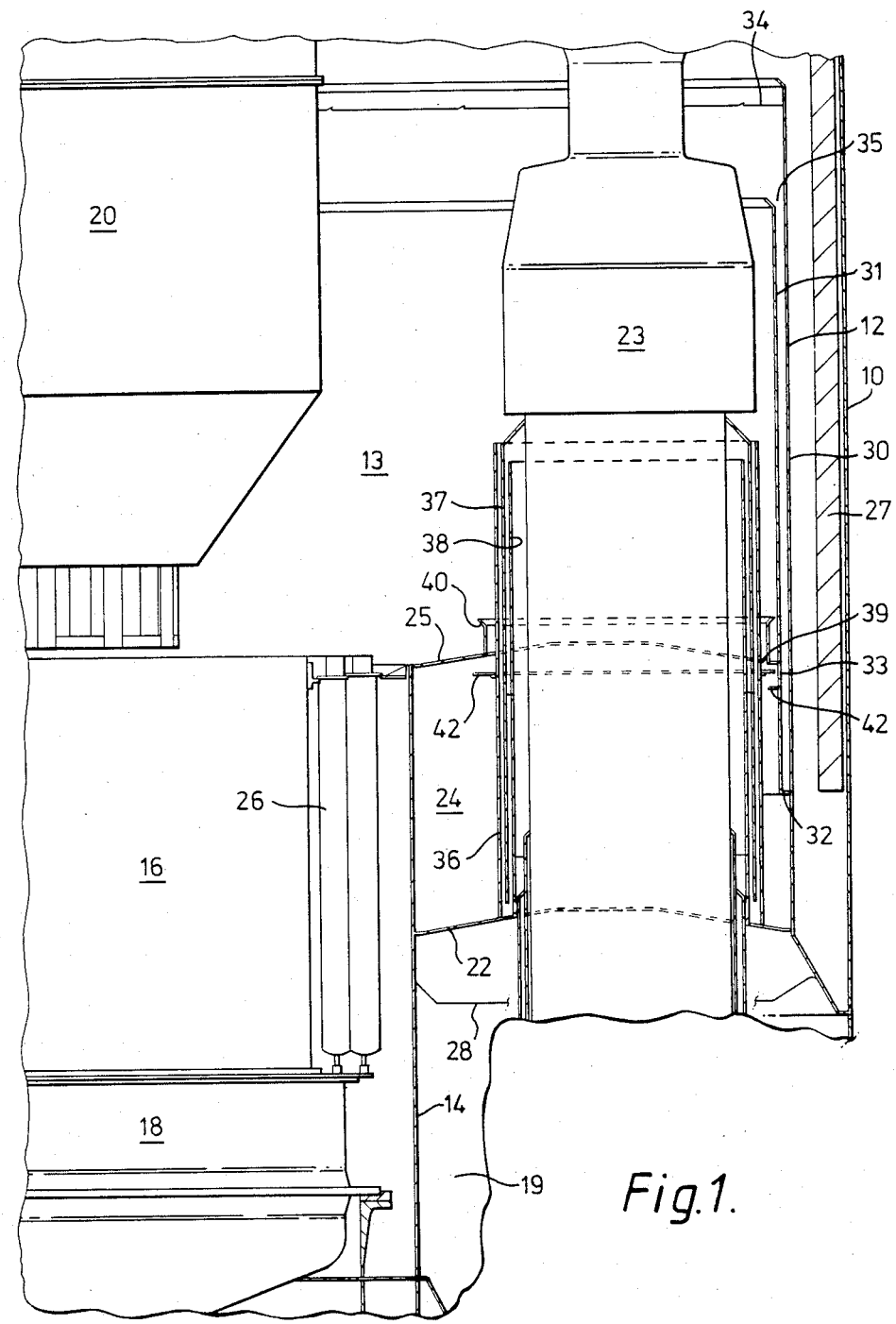
FIG. 1 is a fragmentary view of a liquid sodium cooled fast breeder reactor showing one half of the primary vessel and those of its structural internals necessary for understanding a first embodiment of the invention.

Referring firstly to FIG. 1, the reactor primary vessel 10, which is shown in part only, encloses an inner tank 12 which encloses the hot pool 13 of the reactor, a cylinder 14 supported from the base of the primary vessel by a strongback structure (not shown) and a reactor core 16 mounted on a diagrid 18 also supported by the strongback structure. The cold pool 19 of the reactor occupies the volume of the primary vessel outboard of and beneath the cylinder 14. The inner tank 12 also encloses the above-core structure 20 which incorporates control rods for use in reducing the reactivity of the core when called for and various other instrumentation which need not be described here. In conventional pool-type fast reactor designs, the hot and cold pools are separated by a pool separator deckplate 22 which encircles the core 16 and various reactor internals, such as the primary pumps and intermediate heat exchangers, extend downwardly from the reactor roof and pass through the separator deckplate 22. The primary pumps serve to pump coolant from the cold pool 19 through the reactor core 16 (via the sub-assemblies of which the core is composed) and the hot coolant discharges into the hot pool 13. The intermediate heat exchangers (of which one is shown in outline and is depicted by reference numeral 23 in FIG. 1) draw hot coolant from the hot pool to heat a secondary flow of sodium which is passed to steam generating plant and the cooled primary coolant is discharged back into the cold pool 19.

In the embodiment of FIG. 1, the deck separator plate 22 forms the bottom of an annular intermediate plenum 24 having sides bounded by the cylinder 14 and the inner tank 12 and a roof formed by an upper deckplate or baffle plate 25. The intermediate plenum forms an annular chamber encircling the reactor core and encloses a volume of sodium which, ideally, will be totally stagnant and will stratify to form a thermal barrier between the hot and cold pools. The innermost vertical wall of the intermediate plenum is separated from the core itself by a neutron shield assembly which to some extent acts as a thermal barrier to the heat generated in the core and may even act as a heat sink with respect to the intermediate plenum. The outer vertical wall of the intermediate plenum is thermally insulated by the gas space between the inner tank and the primary vessel, the latter space also accommodating a layer 27 of thermal insulation. Even where the sodium within the intermediate plenum is totally enclosed, some convective flow (which is undesirable where stratification is required) will tend to take place as a result of heat flux transmission through its inner vertical wall depending on the extent to which the neutron shield region acts as a heat source of sink. Nevertheless, substantial stratification can be achieved even in the presence of convective flow within the intermediate plenum and the thermal gradient between the hot and cold pools can, in this way, be extended across a substantial vertical distance corresponding to the height of the intermediate plenum.

Where the sodium is totally enclosed however, the response of the intermediate plenum to temperature changes in the hot pool will be poor and could, for example in the case of a reactor trip, lead to a very steep temperature gradient through the thickness of the upper deckplate 25 with a risk of unacceptable levels of thermal stress. The severity of the temperature differential between the hot pool and the sodium at the top of the intermediate plenum could be reduced by employing a laminated deckplate 25 arrangement but this will tend to significantly increase the complexity of the structure leading to greater costs and fabrication difficulties and still leaves the difficulty of a large vertical temperature gradient along the vertical components and structures.

To improve the response of the intermediate plenum to thermal transients, in the embodiment of FIG. 1 the plenum 24 is provided with thermosiphon means for creating a flow of coolant from the plenum 24 into the hot pool when, for example, the hot pool undergoes rapid cooling as a result of a reactor trip. The thermosiphon means in this case comprises a generally vertical siphon leg 30 of annular form defined between the inner tank 12 and a radially inwardly spaced cylindrical wall 31 which extends below the upper deckplate 25 and is closed at its bottom end 32 but is formed with a series of circumferentially spaced inlet ports 33 immediately below the outer circumference of the deckplate 25 to enable coolant at the highest levels in the plenum to flow into and out of the thermosiphon leg. The wall 31 extends for a substantial distance above the deckplate 25 and terminates a short distance below the normal operating level 34 of the hot pool to provide an annular opening 35.

It will be seen that, when the hot pool cools as a result of a thermal transient, a thermosiphon action results which leads to an upwardly directed coolant flow along the thermosiphon leg 30 so that hotter coolant from the upper region of the intermediate plenum is discharged into the upper region of the hot pool. At the same time, flow of coolant from the hot pool into the intermediate plenum is induced via openings provided for this purpose. In the present case, such openings are provided around the standpipes for the various reactor internals penetrating through the intermediate plenum. For example, as shown in FIG. 1 the stand pipes 36 for the intermediate heat exchangers 23 and associated gas sealing cylinders 37, 38 and surrounded by clearances 39 and upstanding collars 40 through which coolant can enter the intermediate plenum. In this way, the coolant interchange induced by the thermosiphon action serves to cool the upper regions within the intermediate plenum so that rapid temperature changes in the hot pool are accompanied by rapid temperature changes within the intermediate plenum.

In the steady state condition of the hot pool, coolant flow may take place into the intermediate plenum via the clearances 39 and also via the thermosiphon leg 30. To prevent undue disruption of the thermal stratification within the intermediate plenum, such inward flows are deflected generally along the undersurface of the upper deckplate by annular deflectors 42 located beneath the clearances 39 and ports 33.

The upper and lower deckplates 25 and 22 extend generally horizontally but advantageously they include inclined sections as shown which slope upwardly towards the penetration holes in the deckplates so that any gas accumulating at the undersurfaces of the deckplates tends to migrate towards the penetration holes thereby preventing the formation of gas layers at these undersurfaces which would otherwise adversely affect heat transmission.

Figure 2:
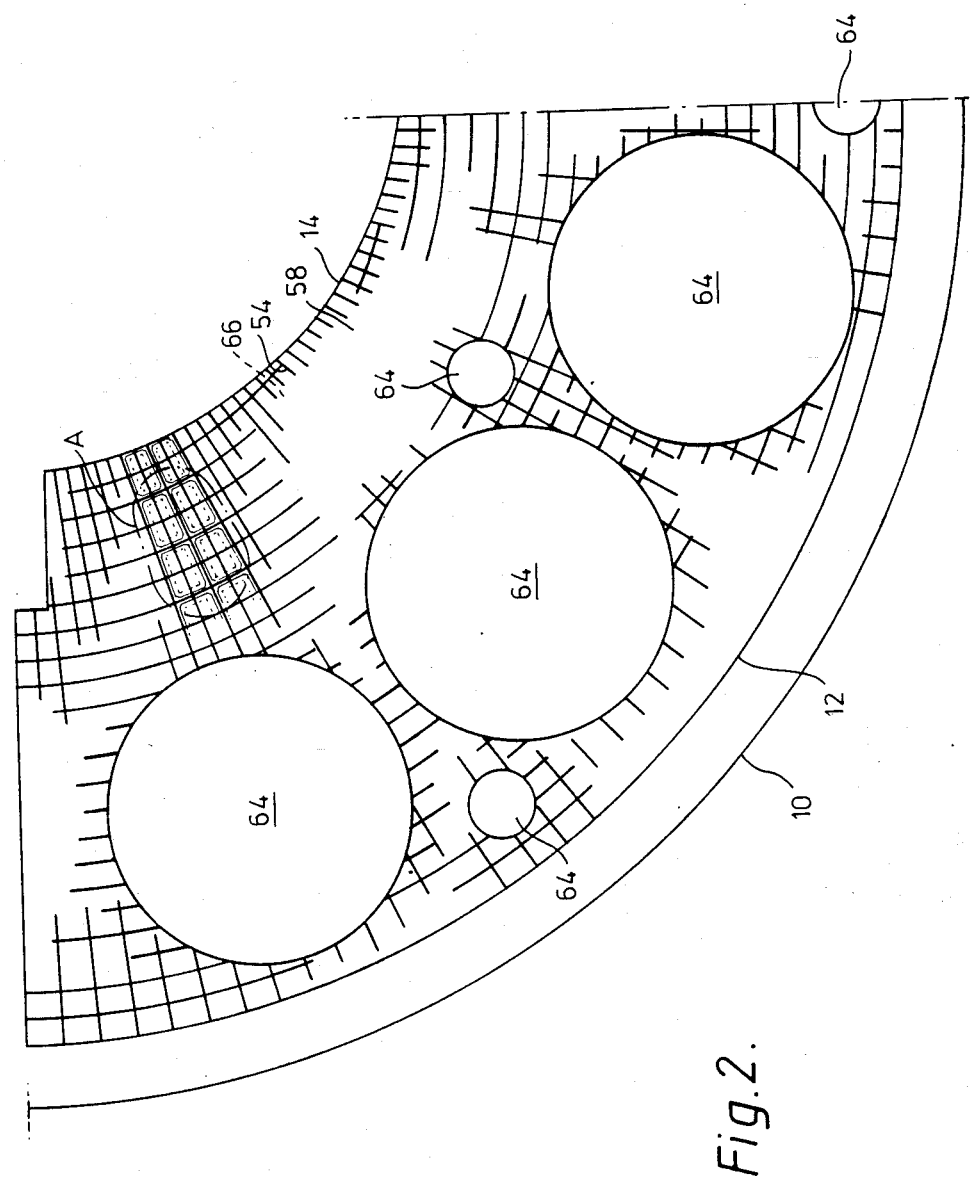
FIG. 2 is a plan view of one quadrant of the intermediate plenum roof of a second embodiment of the invention.
Figure 3:
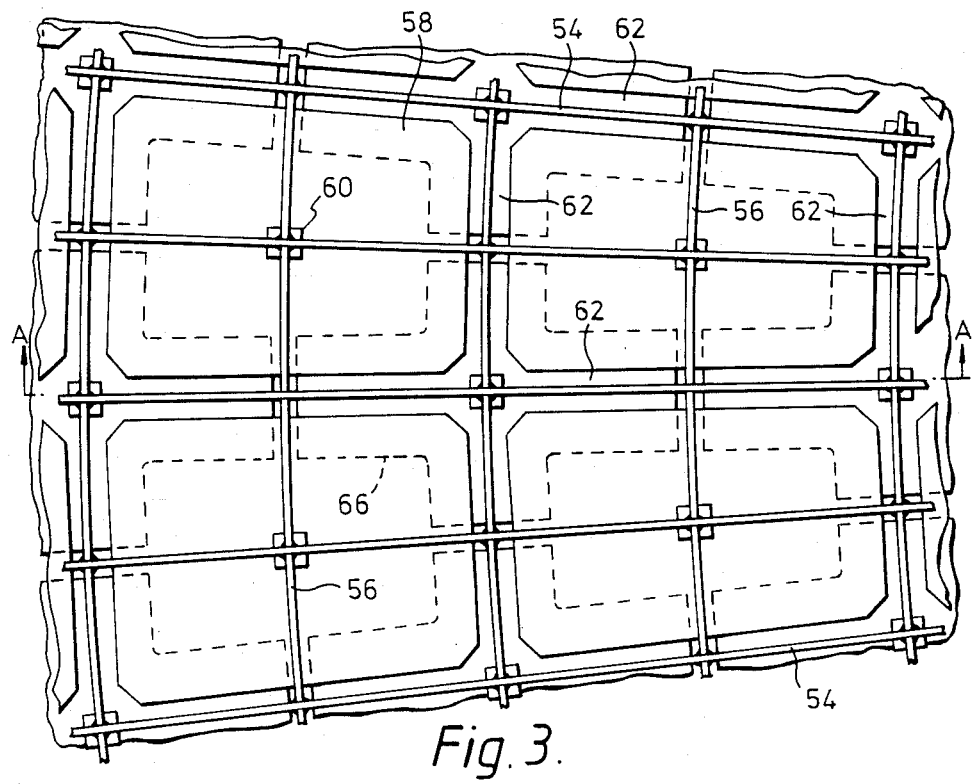
FIG. 3 is an enlarged view of that part of the roof within the ringed area A in FIG. 2.
Figure 4:
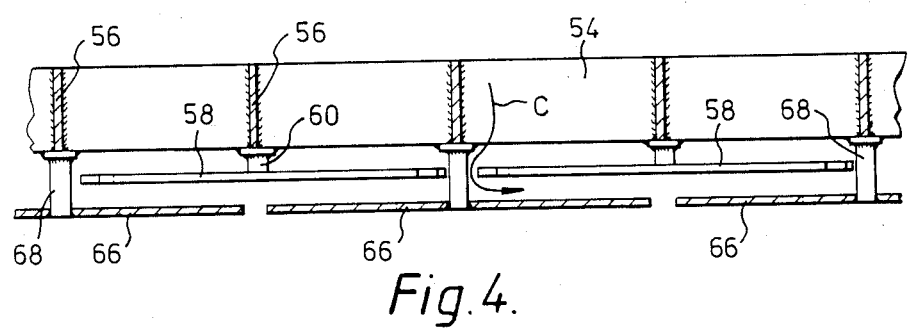
FIG. 4 is a sectional view in the direction A—A in FIG. 3.

Referring now to FIGS. 2-4, in this embodiment the roof of the intermediate plenum is of openwork structure to provide for interchange of coolant with the hot pool during transient conditions. The roof comprises a grid structure supported within the primary vessel 10 between the inner tank 12 and the inner cylinder 14. The grid is made up of a large number of generally radial bars, e.g. 54, intersected by a large number of intersecting generally circumferential bars, e.g. 56. A generally rectangular roof plate 58 is mounted at alternate grid intersections (both in the radial and circumferential directions) by a depending stud 60 so as to form an array of generally co-planar roof plates with gaps 62 between them, the array being interrupted by various openings 64 for the standpipes of reactor internals such as the heat exchangers, coolant pumps and instrumentation bundles.

An array of generally co-planar deflector plates 66 is also supported from the grid structure in superimposed relation with the roof plate array so that the deflector plates 66 overlap horizontally with the gaps 62 and serve to deflect any inward flow of coolant through the gaps 62 in a predominantly horizontal direction (see arrow C in FIG. 4) thereby minimising disruption of the thermal stratification of the coolant within the intermediate plenum under steady state conditions. Each deflector plate 66 is of generally cruciform shape and is suspended from the grid by studs or pins 68 located at alternate grid intersections (both radially and circumferentially).

Figure 5:
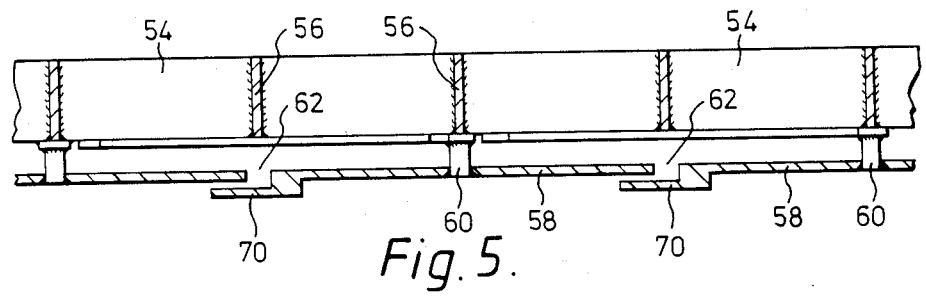
FIG. 5 is a view similar to FIG. 4 but showing a modification.

FIG. 5 illustrates a modification in which the roof plates 58 are retained and the separate deflector plates are replaced by deflector extensions 70 along two of the four sides of each roof plate, the arrangement being such that the gaps 62 are in superimposed relation with the extensions 70 to input a predominantly horizontal flow component to coolant entering the intermediate plenum during steady state conditions.

Figure 6A:
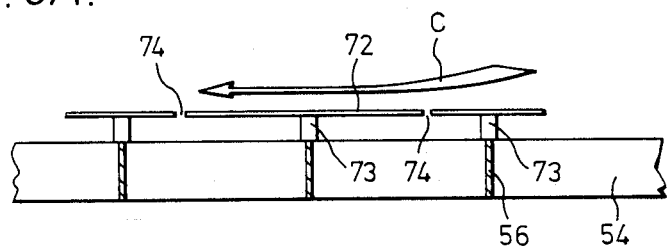
FIGS. 6A and 6B are diagrammatic views of a further modification showing the openwork roof structure in the steady state and transient conditions respectively.
Figure 6B:
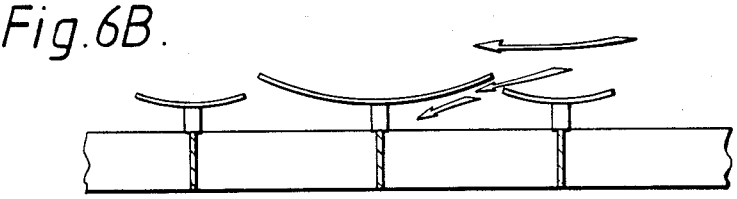

FIGS. 6A and 6B illustrate an embodiment similar to those of FIGS. 2-4 in which an array of grid mounted roof plates 72 are used. In this case they are mounted, via studs of pins 73, above the grid. In the steady state condition when the temperatures prevailing immediately above and below the intermediate plenum roof are substantially the same, as shown in FIG. 6A the roof plates 72 are all substantially co-planar and present restricted gaps 74 for ingress of coolant from convention currents (see arrow C in FIG. 6A) circulating in the hot pool. When, however, a thermal transient occurs in the hot pool the temperature differential developed through the thickness of the roof plates 72 causes them to deform in the somewhat exaggerated manner shown in FIG. 6B since they are unsupported along their edges thus allowing increased coolant flow from the hot pool into the intermediate plenum. This effect can be accentuated if, as shown in FIGS. 6A and 6B, the juxtaposed plates differ substantially in size.

Figure 7:
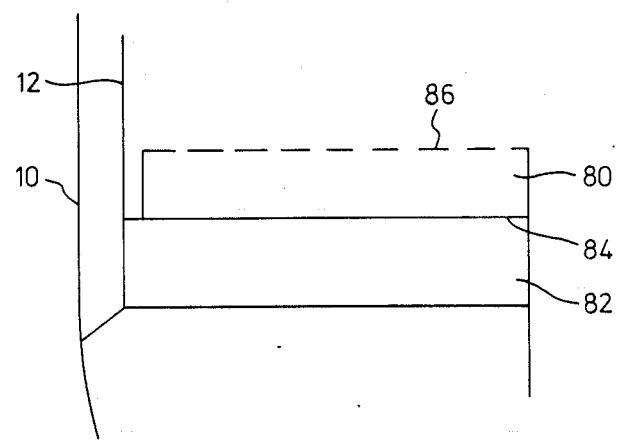
FIG. 7 is a diagrammatic sectional view of a further embodiment involving an intermediate plenum of two part construction.

In FIG. 7, the intermediate plenum is shown divided into two zones 80, 82 by a middle deckplate 84 which separates the lower zone 82 from the upper zone 80 so that heat is transmitted between the two by conduction rather than convection. The middle deckplate 84 may be impermeable apart from clearances for components such as heat exchanger shells. The upper zone is bounded by a roof 86 which is coolant permeable or incorporates a thermal siphon arrangement as shown in FIG. 1, to allow coolant interchange between the hot pool and the upper zone 80 of the intermediate plenum, particularly when thermal transient conditions prevail in the hot pool.

We claim:

1. A liquid metal cooled nuclear reactor, of the kind in which the liquid metal coolant is circulated from a relatively cool region (herein called the cold pool) of the reactor primary vessel through the reactor core where the coolant is in heat exchange relationship with nuclear fuel and emerges at a higher temperature in a higher region (herein called the hot pool) of the reactor vessel, the coolant then being returned from the hot pool to the cold pool via heat exchangers which serve to extract heat from the hot coolant for conversion to other forms of energy, the reactor having an intermediate plenum encircling the reactor core to provide a thermal barrier between the hot and cold pools of the reactor, characterised by means intercommunicating an upper part of the intermediate plenum and the hot pool superimposed in relation thereto to establish therebetween a permanently open, convectively acting communication capable of allowing rapid interchange of coolant convectively and unforced between the intermediate plenum and the hot pool in response to rapid temperature reduction in the hot pool and in a sufficient amount so as to avoid substantial temperature differentials which would otherwise occur between the upper part of the intermediate plenum and the hot pool but incapable of allowing, when the reactor is in a steady state condition, any more than a substantially smaller interchange to occur such as will not materially affect the thermal barrier function of said intermediate plenum.

2. A reactor as claimed in claim 1 in which the means comprises coolant interchange routes between the intermediate plenum and the hot pool, which routes are provided with deflector means for deflecting inward coolant flow to the intermediate plenum in a predominantly horizontal direction.

3. A reactor as claimed in claim 1 in which said means comprises thermosiphon means to effect transfer of coolant from the intermediate plenum to the hot pool.

4. A reactor as claimed in claim 3 in which said thermosiphon means comprises a thermosiphon leg which opens at its opposite ends into the intermediate plenum and the hot pool respectively and is in thermal contact with the hot pool so that, when a fall in temperature occurs within the hot pool, a pressure head is developed to create coolant flow along the thermosiphon leg from the intermediate plenum into the hot pool.

5. A reactor as claimed in claim 4 in which, to compensate for the outward coolant flow along the thermosiphon leg, the intermediate plenum includes one or more openings in communication with the hot pool to admit coolant from the hot pool into the intermediate plenum.

6. A reactor as claimed in claim 4 in which the thermosiphon leg is constituted by one or more standpipes which communicate at the lower end with the interior of the intermediate plenum and open at the upper end adjacent the normal operating level of the hot pool.

7. A reactor as claimed in claim 4 in which the thermosiphon leg comprises an annular passage which encircles the hot pool and is defined between an inner tank, which is located within the reactor primary vessel and encloses the upper regions of the coolant pool, and a radially inwardly spaced, generally vertical annular wall which terminates below the normal operating level of the hot pool.

8. A reactor as claimed in claim 7 in which the intermediate plenum is bounded along its generally vertical outer side by the inner tank and the generally vertical annular wall penetrates below the top of the intermediate plenum and is formed with a series of circumferentially spaced port holes.

9. A reactor as claimed in claim 1 in which openings for said interchange of coolant are provided in the intermediate plenum and are in the form of clearances between penetration holes in the top of the intermediate plenum and structures passing through the intermediate plenum.

10. A reactor as claimed in claim 1 in which the top of the intermediate plenum is of permeable construction.

11. A reactor as claimed in claim 10 in which the intermediate plenum top is perforated with a large number of relatively small holes or comprises a structure of generally vertical honeycomb channels.

12. A reactor as claimed in claim 10 in which the intermediate plenum top comprises an array of generally horizontally disposed plates.

13. A reactor as claimed in claim 12 in which the plates are supported in generally co-planar relationship and in spaced relation to one another to form an openwork structure permitting coolant interchange between the hot pool and the intermediate plenum.

14. A reactor as claimed in claim 13 in which the array of plates is superimposed above an array of generally horizontal deflector plates which overlap with the clearances between the plates above so as to deflect inward coolant flow to the intermediate plenum in a predominantly horizontal direction.

15. A reactor as claimed in 13 in which the plates forming the openwork structure are in relatively closely spaced relation and unsupported at their edges such that, in steady state conditions, flow of coolant into the intermediate plenum is severely restricted and when transient conditions develop and tend to create a temperature differential through the thickness of the plates, the plates deform to enlarge the gaps between adjacent plates and permit increased flow of coolant into the intermediate plenum.

16. A reactor as claimed in claim 1 which the intermediate plenum is divided into at least two vertically superimposed sections, the upper of which is in communication with the hot pool and the lower of which is isolated from any convection flow of coolant within the upper section.

* * * * *